(12) United States Patent
Hoglund et al.

(10) Patent No.: US 9,278,332 B2
(45) Date of Patent: Mar. 8, 2016

(54) INSULATOR UNIT

(75) Inventors: Kasper Hoglund, Ronninge (SE); Magnus Lingvall, Huddinge (SE)

(73) Assignee: Alfa Laval Corporate AB, Lund (SE)

( * ) Notice: Subject to any disclaimer, the term of this patent is extended or adjusted under 35 U.S.C. 154(b) by 62 days.

(21) Appl. No.: 13/807,778

(22) PCT Filed: Jun. 15, 2011

(86) PCT No.: PCT/EP2011/059915
§ 371 (c)(1),
(2), (4) Date: Feb. 14, 2013

(87) PCT Pub. No.: WO2012/000789
PCT Pub. Date: Jan. 5, 2012

(65) Prior Publication Data
US 2013/0149218 A1 Jun. 13, 2013

(30) Foreign Application Priority Data
Jul. 1, 2010 (EP) .................................... 10168122

(51) Int. Cl.
*B01J 19/24* (2006.01)
*F28F 3/08* (2006.01)

(52) U.S. Cl.
CPC ............... *B01J 19/249* (2013.01); *F28F 3/086* (2013.01); *B01J 2219/246* (2013.01); *B01J 2219/249* (2013.01); *B01J 2219/2453* (2013.01); *B01J 2219/2458* (2013.01); *B01J 2219/2461* (2013.01); *B01J 2219/2486* (2013.01); *B01J 2219/2493* (2013.01); *B01J 2219/2497* (2013.01)

(58) Field of Classification Search
None
See application file for complete search history.

(56) References Cited

U.S. PATENT DOCUMENTS

| 3,458,618 | A | * | 7/1969 | Burns et al. .................... 264/249 |
|---|---|---|---|---|
| 5,527,047 | A | | 6/1996 | Waterlanad, III |
| 6,494,614 | B1 | * | 12/2002 | Bennett et al. ................ 366/336 |
| 2002/0071797 | A1 | | 6/2002 | Loffler |
| 2003/0194362 | A1 | | 10/2003 | Rogers |
| 2005/0186585 | A1 | * | 8/2005 | Juncosa et al. .................... 435/6 |
| 2008/0000621 | A1 | | 1/2008 | Hidaka et al. |
| 2008/0267845 | A1 | | 10/2008 | Hoglund et al. |

FOREIGN PATENT DOCUMENTS

| EP | 0057982 A2 | 8/1982 |
|---|---|---|
| JP | 56117666 A | 9/1981 |
| WO | 2007050013 A1 | 5/2007 |
| WO | 2007073281 A1 | 6/2007 |
| WO | 2007122493 A2 | 11/2007 |

(Continued)

OTHER PUBLICATIONS

"Alfa Laval Art Plate Reactor 49: Plate Reactor for Continuous Manufacturing of Chemicals" Alfa Laval Corporate AB, Sweden; 2005.

(Continued)

*Primary Examiner* — Jill Warden
*Assistant Examiner* — Timothy G Kingan
(74) *Attorney, Agent, or Firm* — MKG, LLC

(57) ABSTRACT

An insulator unit for a multipurpose flow module, such as a plate reactor, comprising a plurality of thermally insulating layers arranged in a sandwich structure with a plurality of plates, to provide thermal insulation across the sandwich structure.

7 Claims, 2 Drawing Sheets

(56) References Cited

FOREIGN PATENT DOCUMENTS

| WO | 2008066447 A1 | 6/2008 |
|---|---|---|
| WO | 2009142579 A1 | 11/2009 |
| WO | 2010120234 A1 | 10/2010 |

OTHER PUBLICATIONS

"GORE ePTFE Cable: Technical Summary"; W.L. Gore & Associates, Inc.; 2007.

"GORE GR Sheet Gasketing: Gasketing for Steel Pipes & Equipment"; W.L. Gore & Associates, Inc.; 2006.

* cited by examiner

INSULATOR UNIT

TECHNICAL FIELD

The present invention relates to an insulator unit for a multipurpose flow module, such as a continuous plate reactor, and the use of such an insulator unit in a multipurpose flow module.

BACKGROUND

In a continuous plate reactor, or a flow module for other purposes, a stack of two or more flow plates are clamped together with optional heat exchanger plates, barrier plates and/or end plates, forming one or more flow channels. The plates are clamped together under high pressure in order to ensure good sealing of the flow channels. Different parts of the reactor may need to be thermally insulated from adjacent parts of the reactor to reduce problems associated with transfer of heat. Adjacent flow channels may need to be insulated from each other in order to minimize any thermal crosstalk between reaction channels. End plates of the reactor may need to be thermally insulated from the rest of the stack of plates in order to maintain good sealing of flow channels in the stack. Upon subjection to steep temperature gradients, such as during rapid heating or cooling of a flow plate, such end plates may deform and thereby fail to maintain a uniform pressure distribution and thus good sealing in the stack of plates.

Insulator plates made out of polymer materials with suitable insulating properties, such as PTFE (polytetrafluoroethylene), suffer from the drawback that they may deform plastically under high pressure and high temperature leading to reduced performance and reusability.

SUMMARY

Accordingly, it is an object of the invention to provide a thermal insulator that can stand up to the combination of high pressure and high temperature in a multipurpose flow module. Further objects are to provide such a thermal insulator that is easy to handle, sturdy and that is reusable. Thus, the present invention relates to an insulator unit for a multipurpose flow module, comprising a plurality of thermally insulating layers arranged in a sandwich structure with a plurality of plates, so that to provide thermal insulation across the sandwich structure. Preferably the unit comprises a first and a second plate, defining a first and a second outer side of the sandwich structure, in which sandwich structure the thermally insulating layers are arranged to provide thermal insulation between said first and second outer sides. In one embodiment, the unit is plate-like, in the form of an insulator plate, having a lateral extension larger or much larger than the thickness across the sandwich structure.

As an effect of the sandwich structure comprising said plates and insulating layers, an insulator unit is provided that is easy to handle, that can be used and reused even under subjection to high pressures and temperatures, and that can be inserted and taken out from a multipurpose flow module in a substantially preserved form.

In one embodiment, the sandwich structure further comprises at least one elastic member, which at least one elastic member may be one or more of the plurality of insulating layers. Thus the thermal insulator can provide a distribution of pressure when being subjected to slight uneven pressure distribution. The insulating layers are further preferably ductile, thereby diminishing the risk of cracking upon being subjected to high stresses.

The plates are preferably stiffer than the insulating layers, and may have a Young's modulus above 10 GPa, preferably above 100 GPa. Thus the handling of the insulator unit and the pressure distributing properties of the unit is improved. The plates are preferably made out of creep-resistant materials.

In one embodiment, the plates are made out of a material providing heat transfer along the plate, thereby distributing heat in the lateral direction of the sandwich structure.

In one embodiment, each insulating layer is in the form of a continuous sheet of an insulating material. The insulating layers are further thin in relation to their lateral dimensions. The insulating material preferably has a high yield strength, a low level of creep and/or can resist temperatures between 60° C. and 200° C. Suitable materials for the insulating layers include expanded PTFE (expanded polytetrafluoroethylene), PEEK (polyetheretherketone) and PPS (polyphenylenesulfide).

In one embodiment, at least one of the plates are patterned with a structure so that to retain an adjacent insulating layer in the sandwich structure upon compression of the structure. For example, the pattern is regular or irregular and is arranged so that the grip upon subjection to shear forces between the patterned plate and an adjacent insulating layer in the sandwich structure is improved. Thereby the insulating layer is better retained in the sandwich. Preferably a plurality of the plates in the sandwich is patterned.

In one embodiment, the patterned plate is provided with a pattern in the form of a plurality of openings extending through the same plate, which openings are distributed over the plate. Thereby the plates easily can be provided with said pattern on both sides of the plates. The openings are operable to further increase the thermal insulating properties of the unit. At least one plate defining an outer side of the sandwich structure may be formed essentially without such openings in order to protect the insulating layer covered by the plate from the surroundings.

In one embodiment, the area of the openings makes up at least 5 percent of the surface area of the patterned plate. In another embodiment, the area of the openings further makes up less than 20 percent of the surface area of the patterned plate. Preferably, the area of the openings may take up 6-10% of the surface area of the patterned plate. The area of the openings on the patterned plates is chosen so that on one hand a good retaining effect is reached, and on the other hand the contact pressure provided by the plate to the insulating layer is limited.

In one embodiment, at least one of the insulating layers comprises expanded PTFE (expanded polytetrafluoroethylene). Thereby insulating layers are provided that has good insulating properties and that can be used under high pressures and high temperatures. Further, the shape of the expanded PTFE layers upon subjection to pressure cycling is maintained because of the sandwich structure. Preferably, all the insulating layers in the sandwich structure are made out of expanded PTFE. The material of the insulating layers is further preferably resistant to process chemicals.

In one embodiment, at least one of the plates is a metal plate, preferably a stainless steel plate. Alternatively at least one plate is made out of a nickel based alloy, such as an alloy known under the trademark Hastelloy®. Other possible materials may be titanium, tantalum or any other alloy or metal having a high degree of corrosion resistivity. Thereby the unit is made resistant to various process chemicals.

The insulator unit is preferably in the form of a one-piece unit and further comprises fastening means keeping the sandwich structure together, thereby providing an insulator unit that is particularly easy to handle. The fastening means may comprise at least one rivet extending at least partly through the sandwich structure, and wherein the rivet comprises or consists of a thermally insulating material, preferably PTFE. Thereby the risk of thermal bridging across the sandwich structure is minimized. In one embodiment, the sandwich structure is kept together by fastening means in the form of bonds between the insulating layers and plates, such as adhesive bonds or non-adhesive bonds.

In one embodiment, the fastening means comprises at least one rigid element extending at least partly through the sandwich structure, which rigid element is arranged to provide a thermally insulating gap to the first or the second plate upon compression of the insulator unit. The rigid element could be provided in the form of a screw for fastening the insulator unit to a multipurpose flow module.

The invention further relates to a flow module comprising one or more flow plates, each flow plate having a flow channel, which flow channel has at least one inlet and at least one outlet at each end of the flow channel, and an insulator unit according to any one of the preceding claims.

In a further aspect of the invention, it relates to the use of an insulator unit in a flow module comprising one or more flow plates, to thermally insulate parts of the multipurpose flow module from each other.

Examples of flow modules or plate reactors or other arrangements which can comprise an insulator unit according to the invention or wherein such an insulator unit can be used can be found in WO2007050013, WO2007073281, PCT/SE2010/050397, WO2008066447, and WO2009142579.

The insulator unit according to the invention is also suitable for other flow modules such as other plate reactors or heat exchangers.

Further alternative embodiments of the present invention are defined in the claims. Various embodiments of the invention will now be explained in more detail with reference to the drawings. The drawings are for the purpose of illustrating the invention and are not intended to limit its scope.

DETAILED DESCRIPTION

Figure 1:
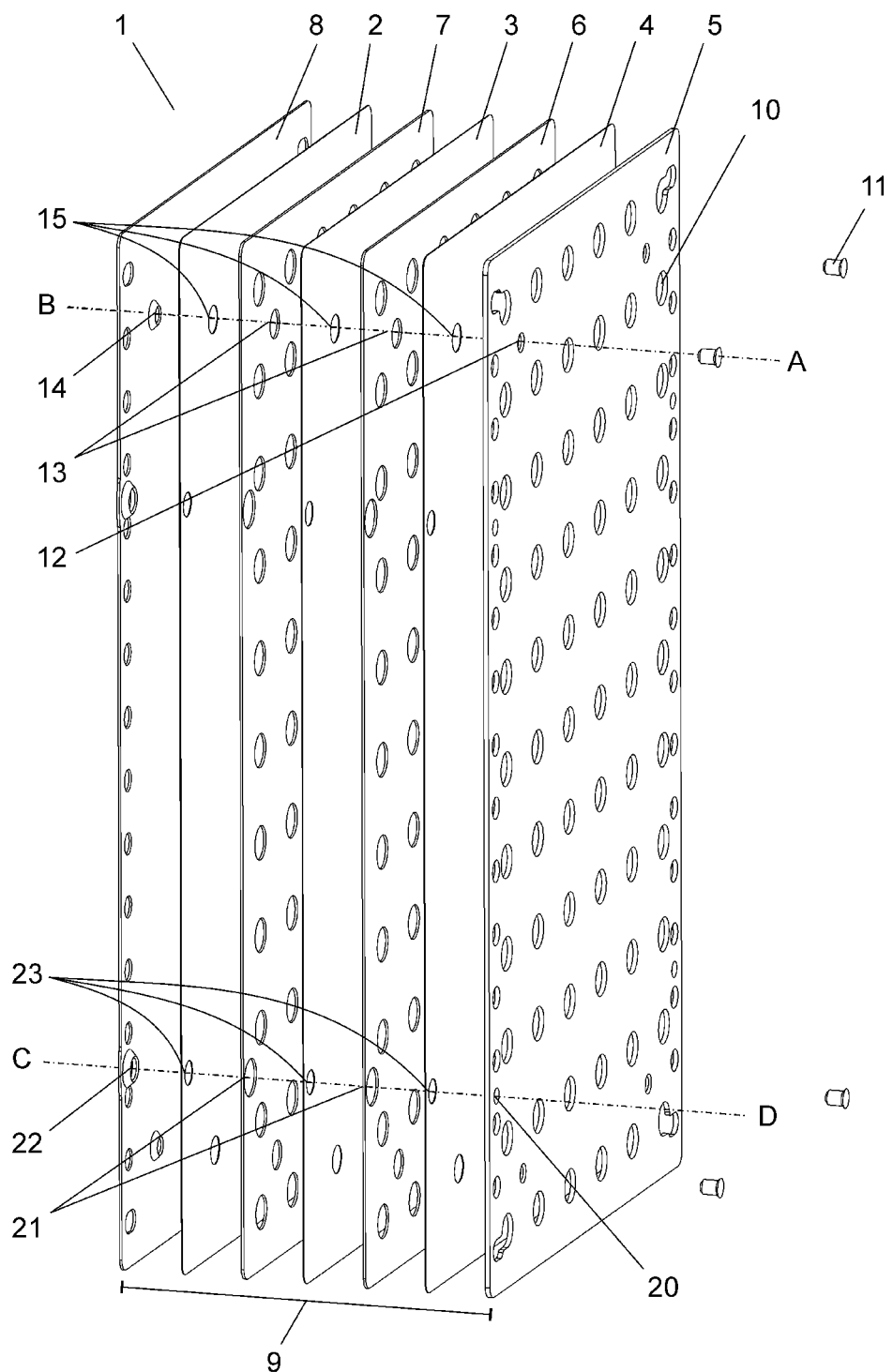
FIG. 1 shows an exploded view of an insulator unit according to one embodiment of the invention.

An insulator unit 1, in an exploded view, is shown in FIG. 1, wherein three insulating layers 2, 3 and 4 are located in-between four plates 5, 6, 7 and 8. The insulating layers and the plates form a sandwich structure 9. The insulating layers are made out of expanded PTFE (expanded polytetrafluoroethylene) having a thickness of 1 mm in an uncompressed state. The plates 5, 6, 7 and 8 are metallic plates made out of acid proof stainless steel. The plate 5 defining one of the outer sides of the sandwich structure 9 has a thickness of 2 mm. The plates 6 and 7, and the plate 8 defining the other outer side of the sandwich structure, are 1 mm thick. The lateral size of the insulating unit is greater than 100 mm, preferably within the range of 200-600 mm, but possibly greater than 1000 mm.

Each of the plates 5, 6 and 7 are provided with patterned surfaces on both sides of the plates, by means of a plurality of holes 10 distributed over each plate. The holes make up about 9% of the surface area of each of the plates 5, 6 and 7. The holes are circular and regularly spaced over the surfaces of the patterned plates. The major part of plate 8, which plate defines an outer surface of the sandwich structure, is free of such patterning in the form of holes. Thereby the plate 8 protects the underlying insulating layer 2 from damage, and defines preferably an outer side of the insulator unit when mounted.

Figure 2:
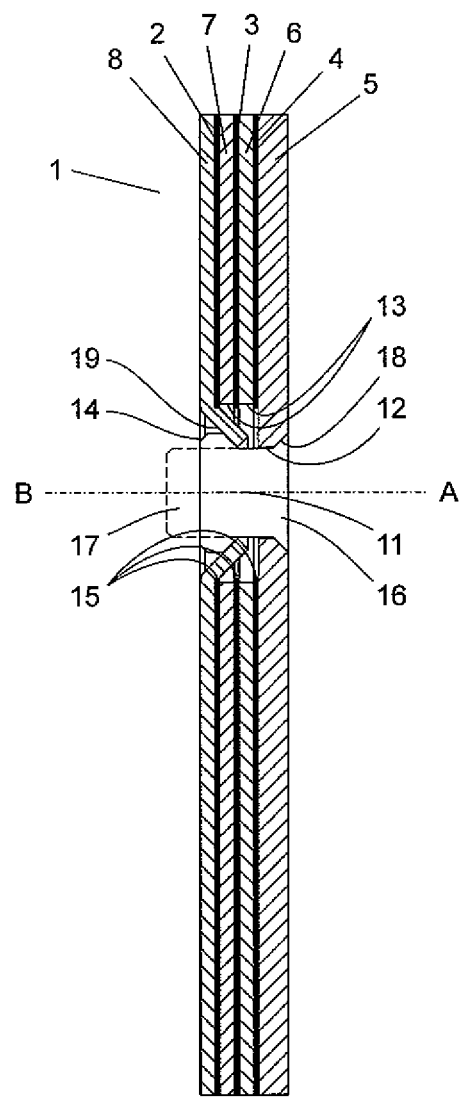
FIG. 2 shows a cross-sectional view of part of an insulator unit according to another embodiment of the invention.

The sandwich structure 9 is held together by fastening means in the form of a plurality of PTFE rivets 11, inserted along the line AB through the holes 12, 13 and 14 in the plates and holes 15 in the insulating layers. In FIG. 2, a close-up of a sandwich structure 9 of an insulating unit 1 is shown in cross-section, describing such a fastening means in further detail. The sandwich structure still comprises three insulating layers 2, 3 and 4 located in-between four plates 5, 6, 7 and 8. A rivet 11 extending through the holes 12, 13, 14 and 15 in the sandwich structure 9 holds the sandwich structure together by means of a conical head part 16 engaging with the plate 5 defining one of the outer sides of the sandwich structure and an end part 17 that is deformed into engagement with the plate 8, defining the other outer side of the sandwich structure. The outer plates 5 and 8 are suitably provided with conical surfaces 18 and 19 surrounding the holes 12 and 14, for engagement with the rivets. The conical surfaces can be provided by means of a conical bore 18, as shown around the hole 12, or by means of a conical depression 19, as shown around the hole 14. The plate 5 provided with a bore is suitably thicker than the plate 8 provided with the depression. The size of the depression in plate 8, and the size of the holes 13 in the plates 6 and 7 is so that to avoid any physical contact between the plates in the sandwich structure, in order to minimize any thermal bridging across the insulator unit. Therefore the size of the holes 13 is about the same as the outer size of the depression surrounding the hole 14. The depth of the depression is less than the total thickness of the plates 6 and 7 and the insulating layers 2, 3 and 4, when fully compressed.

When assembling the sandwich, a rivet 11 is inserted through the holes 12, 13, 14 and 15, along the line AB, and the end part 17 of the rivet is deformed into engagement with the plate 8 by applying pressure.

When in use in a plate reactor, the insulator unit is put under compressive stress. The pressure in such a plate reactor may be within 10-30 MPa, typically 20 MPa. The temperature in such a plate reactor may further be within the range from 60° C. to 200° C. The insulating layers 2, 3 and 4 will compress to about 30% of the initial thickness when subjected to a pressure of about 7-8 MPa. Thus, in the regions where the insulating layers are subjected to compressive stress transferred by the surrounding plates, the layers will compress. In the region of a hole 10, the insulating layer will not compress to any larger extent. Thereby the holes will lock the insulating layers in lateral position during compression, and will diminish the effect of shear stresses on the insulating layers during compression which otherwise may cause the material in the insulating layer to flow plastically. However, even without the holes, the sandwich structure itself will contain the thin insulating layers within the structure by means of mechanical interlocking with the surfaces of the plates.

The insulator unit shown in FIG. 1 further comprises holes for mounting the insulator unit to a plate, e.g. of a plate reactor. Such holes for mounting 20, 21, 22 and 23 extend along the line CD through the plates and insulating layers in the sandwich structure, in a way similar to the holes 12, 13, 14 and 15 for the rivets. The hole 22 in the plate 8, defining an outer side of the insulator unit when mounted, is provided with a conical depression or a conical bore similar to the holes for the rivets. The insulator unit is preferably mounted by inserting and tightening a bolt or screw (not shown), having a conical head, along the line CD through the holes for mounting. During compression of the insulator unit in use in a plate reactor, the elastic expanded PTFE insulating layers will become compressed, thereby decreasing the total thickness of the sandwich structure. The heads of the screws or bolts used for mounting will then loose contact with the depression part surrounding the holes 22. The size of the depression and/or the size of the head of the bolt or screw is so that the head will not extend to the outer surface of the plate 8 in the compressed state. Due to these features, the screw or bolt will still not jeopardize the thermal insulation by means of thermal bridging effects between the outer surfaces of the sandwich structure. As an alternative, the insulator plate may be mounted by bolts or the like already having thermally insulating properties, such as made out of a thermally insulating material.

The invention claimed is:

1. An insulator unit for a multipurpose flow module, comprising a plurality of thermally insulating layers arranged in a sandwich structure with a plurality of plates, to provide thermal insulation across the sandwich structure, wherein the insulator unit further comprises fastening means keeping the sandwich structure together, wherein the sandwich structure comprises at least one elastic member, and wherein said at least one elastic member is at least one insulating layer; said fastening means comprises at least one rivet extending at least partly through the sandwich structure, and wherein said rivet comprises or consists of a thermally insulating material; and
wherein said fastening means is in the form of a screw for fastening the insulator unit to a multipurpose flow module.

2. An insulator unit according to claim 1, wherein each insulating layer is in the form of a continuous sheet of an insulating material.

3. An insulator unit according to claim 1, wherein at least one of the plates is patterned so that to retain an adjacent insulating layer in the sandwich structure upon compression.

4. An insulator unit according to claim 3, wherein the patterned plate is provided with a plurality of openings extending through the same plate, which openings are distributed over the plate.

5. An insulator unit according to claim 4, wherein the area of the openings make up at least 5 percent of the surface area of the patterned plate.

6. An insulator unit according to claim 1, wherein at least one of the insulating layers comprises expanded PTFE or a material selected from one or more of the materials in the group consisting of expanded PTFE, PEEK and PPS.

7. An insulator unit according to claim 1, wherein at least one of the plates is a metal plate.

* * * * *